(12) United States Patent
Raaijmakers

(10) Patent No.: US 11,338,695 B2
(45) Date of Patent: May 24, 2022

(54) VARIABLE POWER CHARGING

(71) Applicant: ABB Schweiz AG, Baden (CH)

(72) Inventor: Stefan Raaijmakers, Delft (NL)

(73) Assignee: ABB SCHWEIZ AG, Baden (CH)

( * ) Notice: Subject to any disclaimer, the term of this patent is extended or adjusted under 35 U.S.C. 154(b) by 282 days.

(21) Appl. No.: 16/736,370

(22) Filed: Jan. 7, 2020

(65) Prior Publication Data

US 2020/0139839 A1 May 7, 2020

Related U.S. Application Data

(63) Continuation of application No. PCT/EP2018/068639, filed on Jul. 10, 2018.

(30) Foreign Application Priority Data

Jul. 10, 2017 (EP) .................................... 17180604

(51) Int. Cl.
*B60L 53/62* (2019.01)
*B60L 50/64* (2019.01)
(Continued)

(52) U.S. Cl.
CPC ............... *B60L 53/62* (2019.02); *B60L 50/64* (2019.02); *B60L 53/66* (2019.02); *H02J 7/0042* (2013.01); *H02J 7/06* (2013.01)

(58) Field of Classification Search
CPC .................................................... B60L 53/62
(Continued)

(56) References Cited

U.S. PATENT DOCUMENTS 10,744,883 B2 * 8/2020 Quattrini, Jr. ......... B60L 53/665
2002/0070705 A1 6/2002 Buchanan et al.
(Continued)

FOREIGN PATENT DOCUMENTS

DE 102009054818 A1 6/2011
GB 2536653 A 9/2016
(Continued)

OTHER PUBLICATIONS

European Patent Office, International Search Report & Written Opinion issued in corresponding Application No. PCT/EP2018/068639, dated Apr. 5, 2019, 11 pp.
(Continued)

*Primary Examiner* — Jerry D Robbins
(74) *Attorney, Agent, or Firm* — Greenberg Traurig, LLP

(57) ABSTRACT

The present invention provides a charging assembly for charging at least one electrically chargeable storage device, in particular an electrically chargeable storage device for driving an electrical vehicle, including multiple isolated DC power outputs, at least one outlet for connection to the at least one electrically chargeable storage device, at least one switching assembly for connecting the multiple isolated DC power outputs to the at least one outlet for connection to the at least one electrically chargeable storage device, whereby the switching assembly is adapted to connect at least two of the multiple isolated DC power outputs in series and/or in parallel to the at least one outlet. The present invention further provides a method for charging at least one electrically chargeable storage device, in particular an electrically chargeable storage device for driving an electrical vehicle, including the steps of providing multiple isolated DC power outputs, providing at least one outlet for connection to the at least one electrically chargeable storage device, and providing at least one switching assembly for connecting the (Continued)

multiple isolated DC power outputs to the at least one outlet for connection to the at least one electrically chargeable storage device, wherein the method includes an additional step of connecting at least two of the multiple isolated DC power outputs in series and/or in parallel to the at least one outlet.

19 Claims, 8 Drawing Sheets

(51) Int. Cl.
    *B60L 53/66*     (2019.01)
    *H02J 7/00*     (2006.01)
    *H02J 7/06*     (2006.01)

(58) Field of Classification Search
    USPC .......................................................... 320/109
    See application file for complete search history.

(56) References Cited

U.S. PATENT DOCUMENTS

| | | | |
|---|---|---|---|
| 2003/0038612 A1 | 2/2003 | Kutkut | |
| 2004/0130292 A1* | 7/2004 | Buchanan | B60L 53/53 320/116 |
| 2013/0049677 A1* | 2/2013 | Bouman | B60L 58/20 320/106 |
| 2013/0057209 A1* | 3/2013 | Nergaard | H02J 7/0042 320/109 |
| 2013/0099581 A1* | 4/2013 | Zhou | H02J 7/34 307/82 |
| 2014/0009106 A1* | 1/2014 | Andrea | H02J 7/0018 320/107 |
| 2015/0123613 A1* | 5/2015 | Koolen | B60L 53/66 320/109 |
| 2015/0165917 A1* | 6/2015 | Robers | B60L 53/68 320/109 |

FOREIGN PATENT DOCUMENTS

| | | |
|---|---|---|
| WO | 2011145939 A2 | 11/2011 |
| WO | 2012000548 A1 | 1/2012 |
| WO | 2013100764 A1 | 7/2013 |

OTHER PUBLICATIONS

Australian Patent Office, Examination Report issued in corresponding Application No. 2018299925, dated Jul. 15, 2020, 4 pp.

* cited by examiner

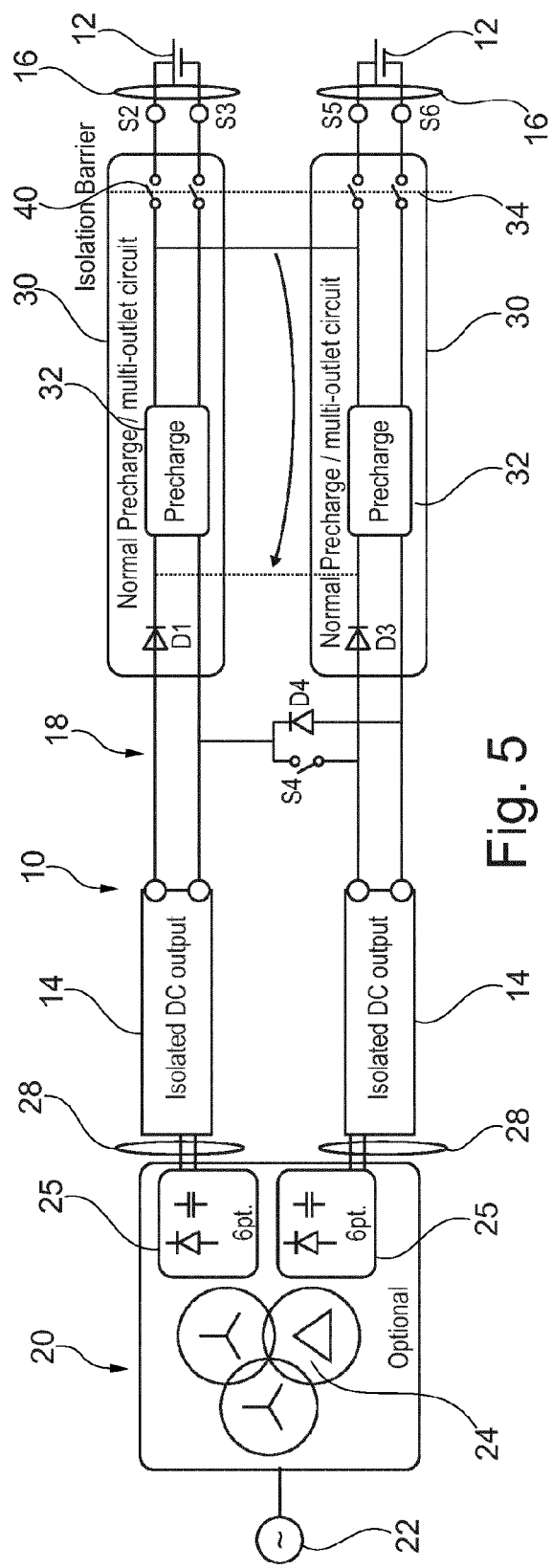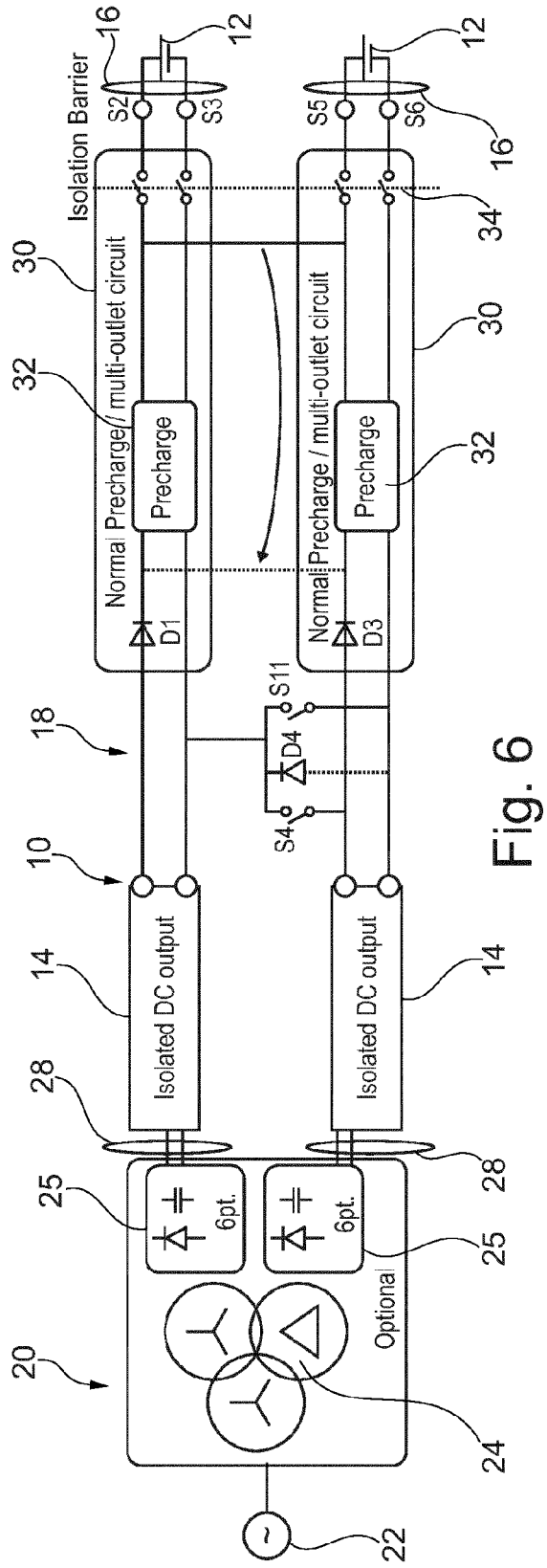

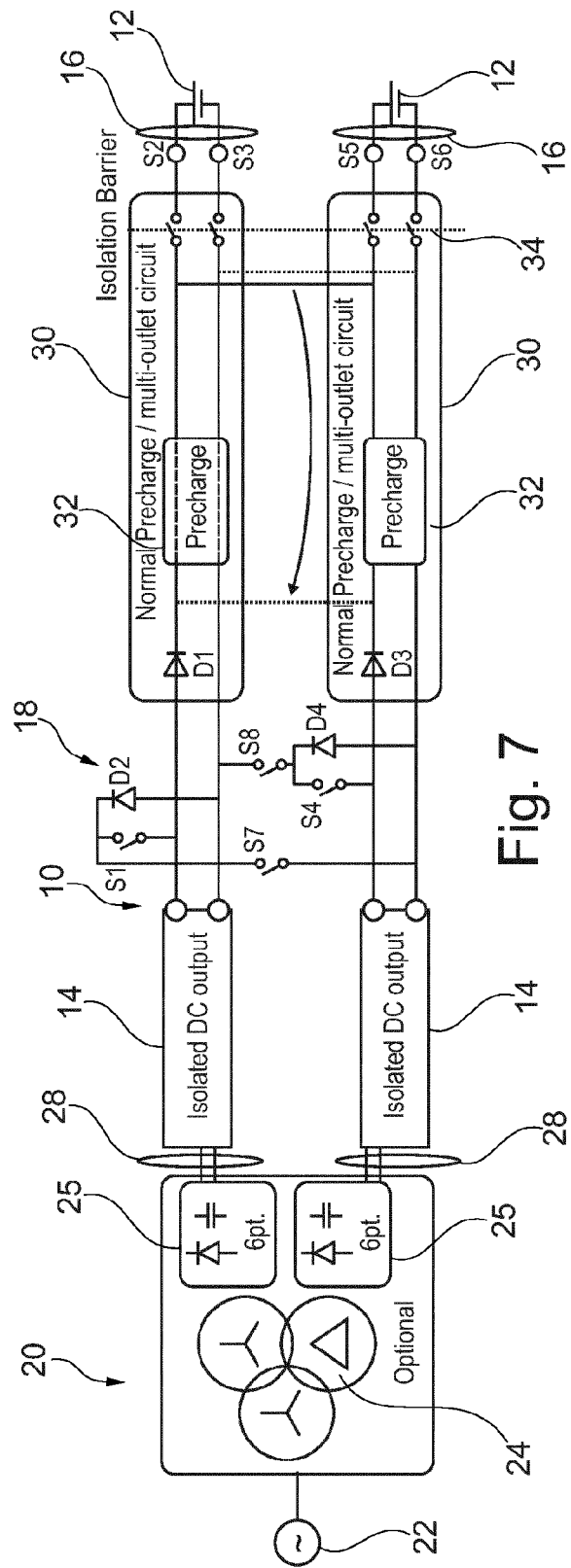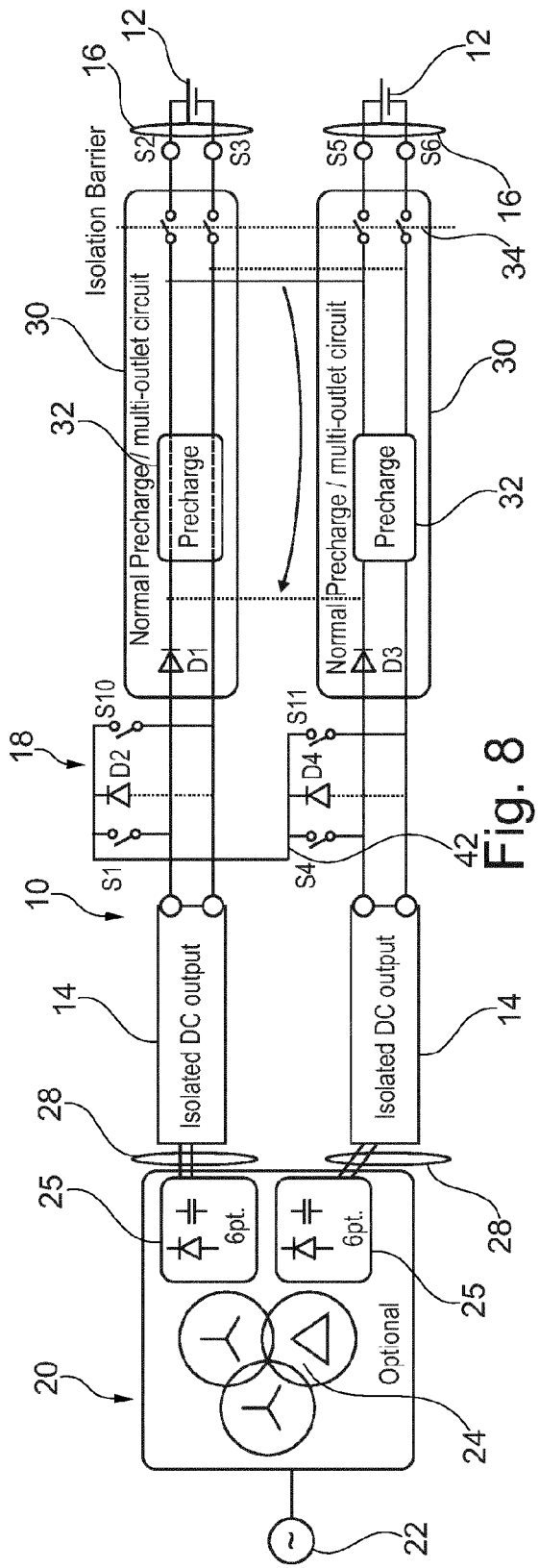

VARIABLE POWER CHARGING

TECHNICAL FIELD

The present invention relates to the area of power charging of chargeable storage devices used in particular in the area of driving electric vehicles. In particular, the present invention relates to a charging assembly for charging at least one electrically chargeable storage device, in particular an electrically chargeable storage device (12) for driving an electrical vehicle, comprising multiple isolated DC power outputs, at least one outlet for connection to the at least one electrically chargeable storage device, at least one switching assembly for connecting the multiple isolated DC power outputs to the at least one outlet for connection to the at least one electrically chargeable storage device. The present invention also relates to a method for charging at least one electrically chargeable storage device, in particular an electrically chargeable storage device (12) for driving an electrical vehicle, comprising the steps of providing multiple isolated DC power outputs, providing at least one outlet for connection to the at least one electrically chargeable storage device, and providing at least one switching assembly for connecting the multiple isolated DC power outputs to the at least one outlet for connection to the at least one electrically chargeable storage device.

BACKGROUND ART

For upcoming and existing electric vehicles, one of the most important issues is charging the batteries of these vehicles. In order to limit a weight of the vehicles, only limited storage capacity for storing electric energy is available. Hence, it is required to provide charging facilities, where the batteries of the electric vehicles can be charged in a sufficiently short time, which is acceptable to a driver of the vehicle. In particular, when compared to a vehicle with a conventional engine based on combustion.

Charging of batteries is nowadays still a very complicated issue. Depending on the vehicle type, the manufacturer, evolving standards for charging connectors, changing charging technologies, different battery technologies, and others, each vehicle can have unique requirements for charging its batteries, which have to be considered at available charging facilities.

In particular, it is important that in state of the Art charging facilities, typically a single vehicle can be charged. Hence, even when multiple charging facilities are provided close to each other, they typically do not share charging hardware. The charging facilities are typically provided as fully independent charging facilities.

In order to reduce charging times, high power charging is applied. In high power charging, there is typically a need either for increased voltage at a normal current, or for an increased current at a normal voltage, or even for an increased voltage at increased current. Since each and every vehicle can specify a different combination of current and voltage for high power charging, different combinations of current and voltage can be required to suit the needs of different vehicles. A further problem is availability of charging facilities. Hence, in some occasions, the demand for charging electric vehicles exceeds availability of charging stations, so that the electric vehicle is essentially unusable.

In this context, document WO 2011/145939 refers to a charging system for electric vehicles, comprising at least one charging port with an interface for power exchange with at least one electric vehicle, at least one power converter, for converting power from a power source such as a power grid to a suitable format for charging the vehicle, wherein the power converter is at a remote location from the charging port, such as a separate room and/or a separate building. Hence, a charging system for electric vehicles comprises a plurality of charging ports, each with an interface for power exchange with at least one electric vehicle, a plurality of power converters, for converting power from a power source such as a power grid to a suitable format for charging the vehicle, a switchable connection matrix, for connecting at least one power converter to at least one charging port, at least one controller, for controlling at least one of the power converters, and/or for controlling the switching operations of the connection matrix and the power converter, and communication means, for exchanging parameters with the at least one electric vehicle.

Furthermore, document WO 2013/100764 A1 refers to a method, a charge controller, a charger and a charging system for charging a battery of an electric vehicle. The method comprises a) determining a priority for each port where an electric vehicle is connected. The method further comprises b) assigning the maximum available power budget to the port with the first priority. The method still further comprises c) performing a charge session at the port with the first priority. The method also comprises d) monitoring the actual power delivered to the vehicle from the priority port. Furthermore, the method comprises e) adjusting the power budget value of the priority port depending on the actual power delivered to the vehicle and f) assigning the remaining power budget to the port with the second highest priority. The method comprises further g) if the power budget exceeds a predetermined threshold value, starting or restarting a charge session at the port where the remaining power budget is assigned and h) repeating the steps of e-h.

DISCLOSURE OF INVENTION

It is an object of the present invention to provide a charging assembly for charging at least one electrically chargeable storage device, in particular an electrically chargeable storage device for driving an electrical vehicle, and a method for charging at least one electrically chargeable storage device, in particular an electrically chargeable storage device for driving an electrical vehicle, which enable a high level of flexibility in respect to support of different types and numbers of electrically chargeable storage devices and a current demand for charging electrically chargeable storage devices.

This object is achieved by the independent claims. Advantageous embodiments are given in the dependent claims.

In particular, the present invention provides a charging assembly for charging at least one electrically chargeable storage device, in particular an electrically chargeable storage device for driving an electrical vehicle, comprising multiple isolated DC power outputs, at least one outlet for connection to the at least one electrically chargeable storage device, at least one switching assembly for connecting the multiple isolated DC power outputs to the at least one outlet for connection to the at least one electrically chargeable storage device, whereby the switching assembly is adapted to connect at least two of the multiple isolated DC power outputs in series and/or in parallel to the at least one outlet.

The present invention also provides a method for charging at least one electrically chargeable storage device, in particular an electrically chargeable storage device for driving an electrical vehicle, comprising the steps of providing multiple isolated DC power outputs, providing at least one outlet for connection to the at least one electrically chargeable storage device, and providing at least one switching assembly for connecting the multiple isolated DC power outputs to the at least one outlet for connection to the at least one electrically chargeable storage device, whereby the method comprises an additional step of connecting at least two of the multiple isolated DC power outputs in series and/or in parallel to the at least one outlet.

The basic idea of the invention is to provide the charging assembly with multiple, isolated DC power outputs, which provide power to the charging assembly. Power provided by the multiple, isolated DC power outputs is provided upon needs of the electrically chargeable storage device. Hence, the charging assembly gains flexibility to charge different electrically chargeable storage devices with different electric specifications. Depending on the configuration of the charging assembly, a single charging assembly can be used to provide high power to just one or of few electrically chargeable storage devices, or to provide normal power to multiple or all electrically chargeable storage devices at the same time. Depending on availability of power, charging capabilities of the electrically chargeable storage devices, power demands of the electrically chargeable storage devices, and other parameters, an optimized charging for differently formed electrically chargeable storage devices can be performed.

Nowadays, typical voltage ranges for electrically chargeable storage devices used in electrical vehicles is between 150-500 VDC. Hence, multiple isolated DC power outputs can be provided in parallel to increase a charging current, and/or multiple isolated DC power outputs can be connected in series to increase charging voltage. This allows for different vehicles with a different design philosophy to be charged using the same charging assembly, without the need of a single isolated DC power output that covers the whole range of possibly required voltages and currents. This design also allows for multi-outlet chargers. Furthermore, costs for additional components can be kept very small compared to existing solutions, because components that are normally used for pre-charging, multiple outlets or output power converters, can be shared and/or re-used.

The charging assembly can be an electric or electronic circuit. The charging assembly can be provided as an independent device. The charging assembly can be installed in the vehicle. Alternatively, the charging assembly can be provided at a fixed charging station. The electrical vehicle is a vehicle with an electric engine for driving the vehicle. It can be fully electrically driven, i.e. only with an electric engine, or partially, e.g. when provided with a combustion engine together with an electric engine.

The electrically chargeable storage devices typically refer to batteries for providing power to an electrical engine for driving the vehicle. The batteries are typically formed with multiple individual battery cells, which are combined in any suitable parallel and/or series combination for storing a specific electrical energy and providing a specific electrical voltage and current to the vehicle. Any suitable kind of storage technology can be used for providing the battery.

The simplest configuration of the charging assembly comprises a connection of one isolated DC power output to one electrically chargeable storage device. However, in order to provide different voltages and/or currents to the electrically chargeable storage device, the switching assembly can establish required connections between the multiple isolated DC power outputs and the at least one electrically chargeable storage device.

According to a modified embodiment of the invention, the charging assembly comprises communication means for connecting to corresponding communication means of the storage device and for receiving a maximum charging voltage from the storage device, and the charging assembly controls the switching assembly to connect at least two of the multiple isolated DC power outputs in series and/or in parallel to the at least one outlet depending on the maximum charging voltage. Hence, the storage device itself or an associated entity can comprise the corresponding communication means in order to perform e.g. a kind of handshake and to exchange charging parameters and agree on a set of charging parameters. Based on the known maximum charging voltage, the charging assembly can start charging the storage device with an optimized voltage, e.g. based on the maximum charging voltage and voltages required to charge further connected storage devices. Furthermore, based on the maximum charging voltage, charging can be started immediately at maximum power. Interruptions of a charging process when e.g. identifying possible charging parameters by trial and error can be omitted. According to a modified embodiment of the invention, the charging assembly controls the switching assembly to dynamically configure a maximum charging voltage. This enables using the charging assembly of the present invention even with storage devices and in particular electric vehicles comprising such storage devices, which do not possess means to transfer data from the storage device to the charging assembly. However, the charging assembly can improve a charging process by providing support for essentially kind of storage devices. According to a modified embodiment of the invention, the charging assembly comprises multiple outlets for connection to multiple electrically chargeable storage devices, whereby each outlet is connectable to one electrically chargeable storage device, and the switching assembly is adapted to connect at least two of the multiple isolated DC power outputs in series and/or in parallel independently to multiple outlets. Hence, individual and separate connection of two or more electrically chargeable storage device can be enabled. However, charging capabilities may vary depending on a detailed internal design of the charging assembly. Parallel charging of multiple electrically chargeable storage devices can be realized depending on capabilities of the charging assembly.

According to a modified embodiment of the invention, the charging assembly comprises at least one isolation power supply, each of which provides at least two supply outputs for connection to one isolated DC power output each. Hence, the isolation power supply enables isolation from a source powering the charging assembly. Furthermore, the isolation power supplies each enable supply of multiple isolated DC power outputs. The isolation power supply is typically connected at its power supply side to a power source, typically an AC power source.

According to a modified embodiment of the invention, the isolation power supply comprises an AC power source and at least one out of a twelve-point rectifier or a Vienna rectifier, and the twelve-point rectifier or a Vienna rectifier have two supply outputs for connection to one isolated DC power output each. When equally loading the supply outputs, each of the twelve-point rectifier and the Vienna rectifier can easily be operated, whereby a backlash to a power source can be reduced. The twelve-point rectifier is provided at its secondary side, i.e. the side connected to the DC power outputs, with a wye and delta secondary configuration. Preferably, each DC power output is connected to six points of the twelve-point rectifier. When equally loaded, two DC power outputs together form a twelve-point load to the twelve-point rectifier. Hence, advantages of twelve-point rectification are satisfied without the need of additional circuitry, e.g. a (coupled) inductor on the rectifier. The Vienna rectifier refers to an AC rectifier or PFC topology with a split DC bus. Each isolated DC power output is fed with half the voltage of the DC bus. The advantage is for instance that all 650V devices can be used throughout the converter, in the case of for instance a Vienna rectifier. Care has to be taken that both DC power outputs are equally loaded to keep the bus symmetrical, unless the PFC topology allows for different loading.

According to a modified embodiment of the invention, the isolation power supply is configured to operate both supply outputs with an essentially equal load. The equal load enables a simple operation, and also reduces backlash to a power source connected to the charging assembly.

According to a modified embodiment of the invention, each isolated DC power output comprises an isolation converter. The isolation converter performs a galvanic isolation between input and output side thereof.

According to a modified embodiment of the invention, the isolation converters are commonly operated at a current set-point of a multiple of a maximum current of each isolation converter. Different configurations are possible, which are only limited by the availability of the DC power outputs and overlapping demands of electrically chargeable storage devices connected thereto.

According to a modified embodiment of the invention, the charging assembly comprises at least one outlet charger, each of which is connected to one outlet. The outlet charger may perform further functions for charging the electrically chargeable storage device. Preferably, the outlet charger communicates with the electrically chargeable storage device in order to perform an ideal charging operation.

According to a modified embodiment of the invention, the charging assembly comprises at least one pre-charge stage, each of which is connected to one outlet. The pre-charge stage performs a negation of charging parameters with the electrically chargeable storage device. Hence, the pre-charge stage preferably comprises a communication unit for negotiation of charging settings with the respective electrically chargeable storage device connected to the outlet. The pre-charge stage is preferably part of the outlet charger.

According to a modified embodiment of the invention, the switching assembly comprises a combination of active and passive switching elements. Active and passive switching elements are preferably chosen to enable provisioning of a cost efficient switching assembly. Furthermore, by providing a smart control, switching elements of the converters and/or charge outlets can be re-used as part of the switching matrix, so that only small or even no changes in the hardware compared to existing solutions are required. Active switching elements comprise active semiconductors, e.g. transistors, IGBT, thyristors, or others, as well as relays or other mechanical switches. Passive switching elements comprise e.g. diodes. Mechanical switches are preferred to perform an isolation between different components.

According to a modified embodiment of the invention, the charging assembly comprises a vertical isolation barrier, which is provided to vertically separate the electrically chargeable storage devices. Hence, feedback from the different electrically chargeable storage devices in direction to a main power supply is avoided. Also, circulating currents can be controlled to be avoided. The vertical isolation barrier can be realized with at least one or multiple isolation switching elements. The isolation switching elements can be part of the switching assembly.

According to a modified embodiment of the invention, the charging assembly comprises at least one horizontal isolation barrier, which is provided to horizontally separate the charging assembly between individual isolated DC power outputs. The at least one horizontal isolation barrier enables a high degree of independency between the individual isolated DC power outputs. The horizontal isolation barrier can be realized with at least one or multiple isolation switching elements. The isolation switching elements can be part of the switching assembly.

According to a modified embodiment of the invention, the step of providing at least one outlet for connection to the at least one electrically chargeable storage device comprises providing multiple outlets, and the step of connecting at least two of the multiple isolated DC power outputs in series and/or in parallel to the at least one outlet comprises connecting at least two of the multiple isolated DC power outputs in series and/or in parallel independently to multiple outlets. Hence, a very high level of freedom is achieved in respect to configuration of isolated DC power outputs, the electrically chargeable storage device, and the at least one outlet.

According to a modified embodiment of the invention the step of connecting at least two of the multiple isolated DC power outputs in series to the at least one outlet comprises operating at least one of the at least two of the multiple isolated DC power outputs at a current set-point slightly higher than at least one of the at least two of the multiple isolated DC power outputs, preferably between a 1% and a 40% higher, further preferred between a 3% and a 30% higher, still further preferred between a 5% and a 20% higher. Preferably, the vehicle will communicate its maximum battery voltage and/or current for charging. The switching matrix can be pre-configured before charging in order to allow for the maximum voltage of the storage device to be applied when charging.

In parallel configuration, the voltage and current setpoints for all modules can be the lreq/4 or another distribution can be chosen, depending on the current demand. If for a period of time Ireq<3*Imodule we can reduce the number of parallel modules and release an outlet to be available for the next customer. If the current Ireq<2*Imodule we can release the outlets to be available for series operation as well. This availability of voltage and current, or power can be indicated at the outlet. In particular, if the DC power outputs are connected in series, a voltage setpoint for the DC power outputs can be Vset/2. A current set point can be distributed evenly or unevenly between the DC power outputs. By giving some DC power outputs a different setpoint than others, they can be forced into voltage control or current control. The set points have to be well chosen in order to prevent oscillations. For instance, if two DC power outputs are connected in series, a bottom one has a slightly higher current set point Iset*1.1 and voltage setpoint Vset/2. Therefore, the respective DC power output will always be in voltage control, while the top module will determine a current regulation Iset, also with voltage setpoint V/2. In this way, a current regulation of both DC power outputs will not interfere with each other. If there are two strings of DC power outputs provided in parallel, a current should be nicely distributed between the bottom DC power outputs, e.g. if they are both set to Iset*1.1/2 forcing them in voltage control, while the top DC power outputs are set to Iset/2 to regulate the current.

For the transition from series to parallel configuration, the current needs to be adjusted to the maximum current available in the whole string. Then, part of the configuration shuts down its charge current and output voltage is reduced to 0V. The matrix configuration (seamlessly) changes into a series configuration, whereby the output diodes should take care of this transition. Then the voltages can be equalized between the DC power outputs without dips/ripple in its output current, or at least with a reduced level of dips/ripple in the output current.

BRIEF DESCRIPTION OF DRAWINGS

These and other aspects of the invention will be apparent from and elucidated with reference to the embodiments described hereinafter.

In the drawings:

FIG. 5 shows a schematic view of a charging assembly according to a fifth embodiment comprising two isolated DC outputs connected to a twelve-point transformer and two outlet chargers, FIG. 6 shows a schematic view of a charging assembly according to a sixth embodiment comprising two isolated DC outputs connected to a twelve-point transformer and two outlet chargers, where only one outlet can be used at a time, FIG. 7 shows a schematic view of a charging assembly according to a seventh embodiment comprising two isolated DC outputs connected to a twelve-point transformer and two outlet chargers, where only one outlet can be used at a time, FIG. 8 shows a schematic view of a charging assembly according to an eighth embodiment comprising two isolated DC outputs connected to a twelve-point transformer and two outlet chargers, where only one outlet can be used at a time, with double series/parallel switching capability with a reduced number of lines connecting the two outlet chargers compared to the seventh embodiment.

DETAILED DESCRIPTION OF THE INVENTION

Figure 1:
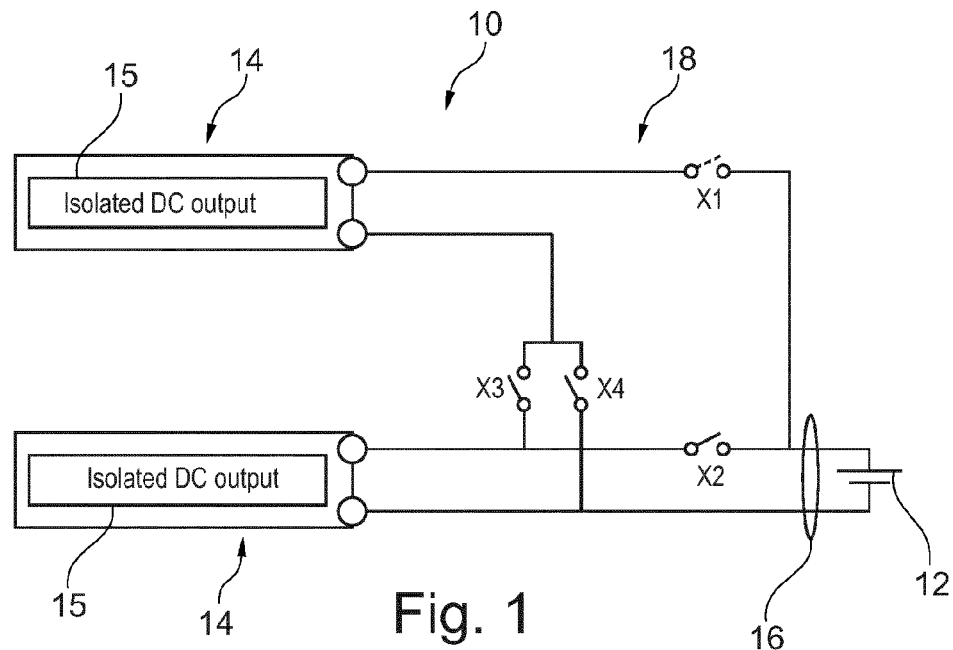
FIG. 1 shows a schematic view of a charging assembly according to a first, preferred embodiment comprising two isolated DC outputs.

FIG. 1 shows a schematic view of a charging assembly 10 according to a first, preferred embodiment. The charging assembly 10 is provided for charging one electrically chargeable storage device 12, which is a battery for providing power for driving an electrical vehicle. A connection of the charging assembly 10 to a power source is not explicitly shown. However, such a connection can be clearly understood and applied based on the description of the further embodiments.

The charging assembly 10 of the first embodiment comprises two isolated DC power outputs 14, each of which comprises an isolation converter 15. The charging assembly 10 of the first embodiment further comprises one outlet 16 for connection to the electrically chargeable storage device 12. The two isolated DC power outputs 14 are connectable to the outlet 16 for charging the electrically chargeable storage device 12.

According to the first embodiment, a switching assembly 18 is provided in order to connect the two isolated DC power outputs 14 either in parallel or in series with its switching elements X1, . . . , X4. Switching element X1 is optional in this embodiment. For parallel operation of the isolated DC power outputs 14, active switching elements X1, X2 and X4 are closed. For series operation of the isolated DC power outputs 14, only active switching element X1 and X3 are closed.

Figure 2:
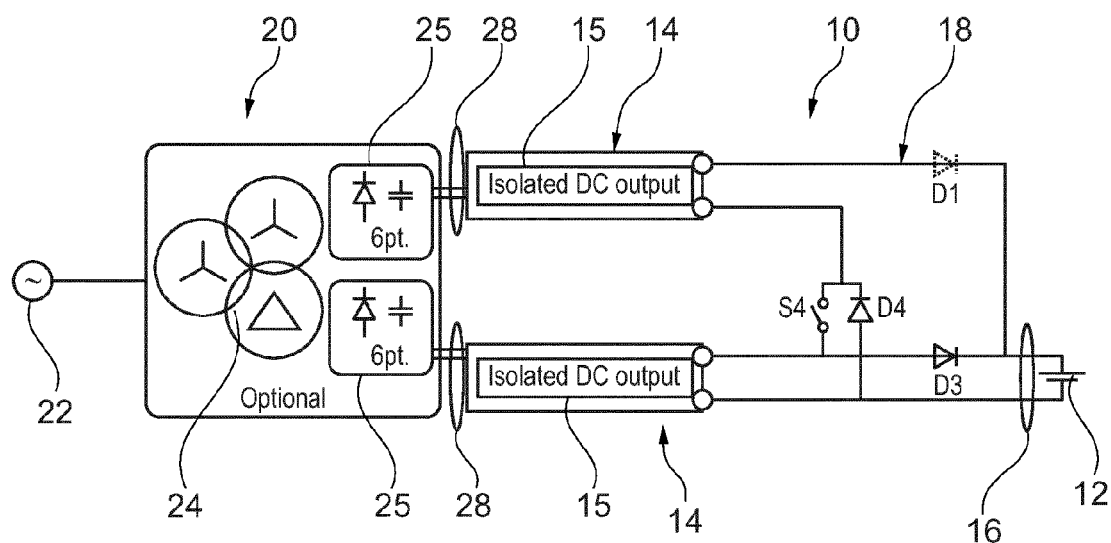
FIG. 2 shows a schematic view of a charging assembly according to a second embodiment comprising two isolated DC outputs connected to a twelve-point transformer.

FIG. 2 shows a charging assembly 10 according to a second embodiment.

The charging assembly 10 of the second embodiment is based on the charging assembly 10 of the first embodiment. Hence, only differences between the two charging assemblies 10 will be discussed in detail as required. A repeated discussion of identical details is omitted. Hence, details of the charging assembly 10 of the second embodiment are identical to those of the charging assembly 10 of the first embodiment, if not otherwise stated.

As can be seen in detail in FIG. 2, the charging assembly 10 of the second embodiment comprises an isolation power supply 20, which is connected to an AC power source 22. According to the second embodiment, the isolation power supply 20 comprises a twelve-point transformer 24, which provides two six-point supplies 25 to be connected as supply outputs 28. The twelve-point rectifier 24 comprises a secondary winding with a wye and delta structure.

The charging assembly 10 of the second embodiment comprises two isolated DC power outputs 14 connected to the twelve-point transformer 24, i.e. connected to the supply outputs 28. The isolated DC power outputs 14 are connected via switching assembly 18 to the outlet 16 and the electrically chargeable storage device 12. The switching assembly 18 comprises switching elements, which are an active switching element S4 and passive switching elements D1, D3, D4, which are provided as diodes according to the second embodiment. The Active switching element S4 is used to force the DC power outputs 14 in series. With active switching element S4 being off, a current of the lower of the isolated DC power outputs 14 in FIG. 2 follows a normal path through passive switching element D3. The current of the upper isolated DC output 14 in FIG. 2 is free to flow through passive switching element D4, and optionally through passive switching element D1, effectively putting the isolated DC power outputs 14 in parallel. With active switching element S4 closed, passive switching element D4 will block, and sees a voltage of the lower DC output 14. Passive switching element D3 will block and sees the voltage of the upper DC output 14. The current flows through active switching element S4 and optionally through passive switching element D1, effectively putting the DC power outputs 14 in series. Active switching element S4 can be implemented with a semiconductor, for instance IGBT or MOSFET, or a mechanical switching element with functional isolation between its open contacts.

Figure 3:
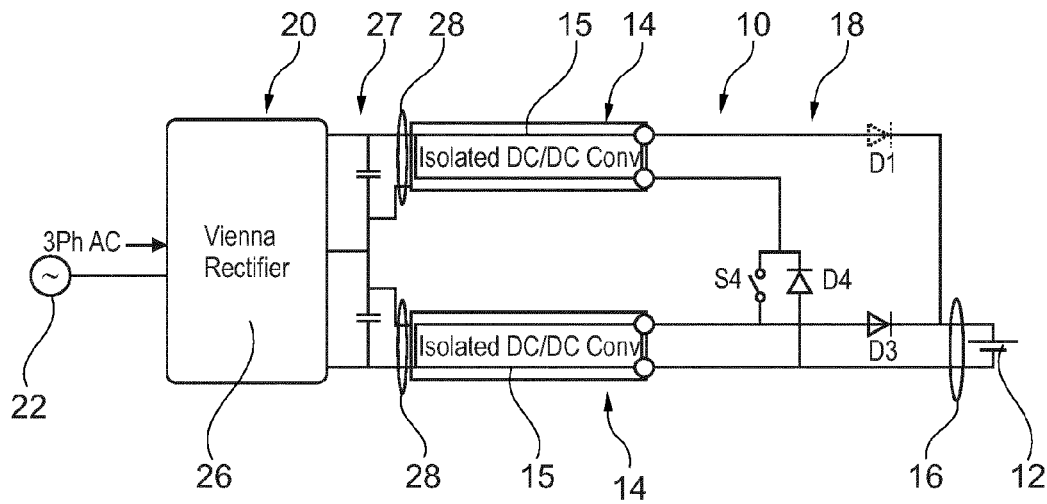
FIG. 3 shows a schematic view of a charging assembly according to a third embodiment comprising two isolated DC outputs connected to a Vienna-rectifier.

FIG. 3 shows a charging assembly 10 according to a third embodiment. The charging assembly 10 of the third embodiment is based on the charging assembly 10 of the second embodiment. Hence, only differences between the two charging assemblies 10 will be discussed in detail as required. A repeated discussion of identical details is omitted. Hence, details of the charging assembly 10 of the third embodiment are identical to those of the charging assembly 10 of the second embodiment.

In contrast to the charging assembly 10 of the second embodiment, the charging assembly 10 of the third embodiment comprises an isolation power supply 20, which comprises a Vienna rectifier 26 instead of the twelve-point rectifier 24 of the second embodiment.

The Vienna rectifier 26 refers to an AC/DC rectifier or PFC topology with a split DC bus 27. Two isolated DC power outputs 14 are connected to the Vienna-rectifier 26. Each isolated DC power output 14 is fed with half the voltage of the DC bus 27. The operation of the charging assembly 10 of the third embodiment is as described above with respect to the charging assembly 10 of the second embodiment.

Figure 4:
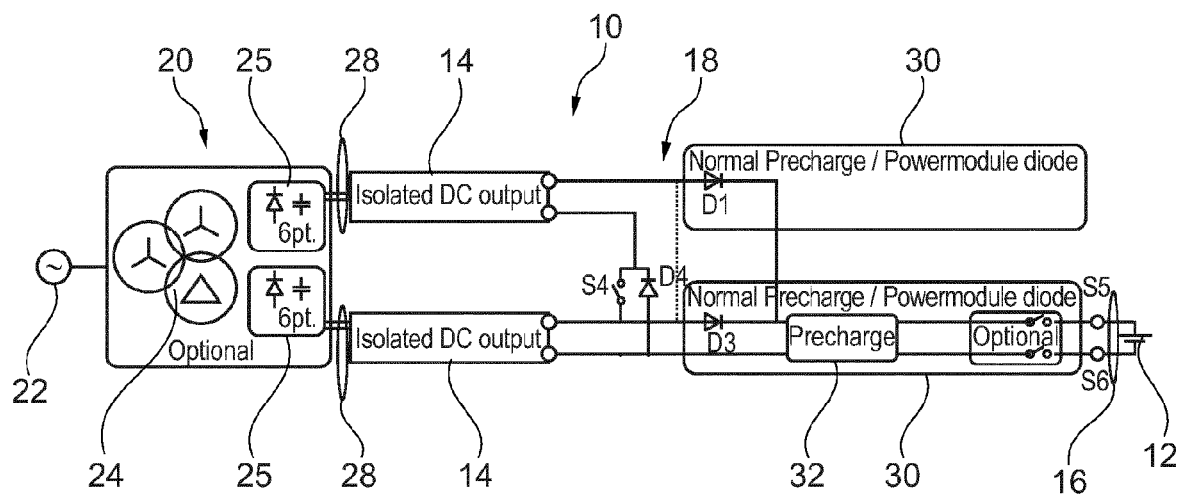
FIG. 4 shows a schematic view of a charging assembly according to a fourth embodiment comprising two isolated DC outputs connected to a twelve-point transformer and one outlet charger.

FIG. 4 shows a charging assembly 10 according to a fourth embodiment. The charging assembly 10 of the fourth embodiment is based on the charging assembly 10 of the second embodiment. Hence, only differences between the two charging assemblies 10 will be discussed in detail as required. A repeated discussion of identical details is omitted. Hence, details of the charging assembly 10 of the fourth embodiment are identical to those of the charging assembly 10 of the second embodiment.

Compared to the charging assembly 10 of the second embodiment, the charging assembly 10 according to the fourth embodiment additionally comprises two outlet chargers 30. A lower outlet chargers 30, as shown in FIG. 4, is connected to the outlet 16. The outlet charger 30 comprises a pre-charge stage 32. The pre-charge stage 32 performs a negotiation of charging parameters with the electrically chargeable storage device 12.

The operation of the charging assembly 10 of the fourth embodiment is as described above with respect to the charging assembly 10 of the second embodiment. Although passive switching elements D1, D3 are shown as part of the two outlet chargers 30, operation of the charging assembly 10 is not modified. The passive switching elements D1, D3 are provided based on a requirement of the pre-charge stage 32 needed for a charging protocol. Hence, these passive switching devices D1, D3 are re-used depending on the requirements. In an alternative embodiment, a single outlet charger 30 is provided with the pre-charge circuit 32 depending on the charge protocol. Hence, contactors are provided to switch off the output quickly to make the connectors touch safe. The charge protocol can be e.g. the Japanese standard CHAdeMO, the or from IEC 61851-23 ed 1.0 2010 for the CCS (EU/US) charging system.

FIG. 5 shows a charging assembly 10 according to a fifth embodiment. The charging assembly 10 of the fifth embodiment is based on the charging assembly 10 of the fourth embodiment. Hence, only differences between the two charging assemblies 10 will be discussed in detail as required. A repeated discussion of identical details is omitted. Hence, details of the charging assembly 10 of the fifth embodiment, which are not further discussed, are identical to those of the charging assembly 10 of the fourth embodiment.

Compared to the charging assembly 10 of the fourth embodiment, the charging assembly 10 according to the fifth embodiment comprises two outlets 16 and two identical outlet chargers 30. The outlet chargers 30 each comprise a pre-charge stage 32 and have an identical configuration. However, according to the fifth embodiment, the two outlets 16 cannot be operated simultaneously. Hence, only one outlet 16 can be used at a time, i.e. one outlet 16 can only connect to one of the DC power outputs 14, while the other DC power output 14 can be connected both in series or in parallel.

An upper electrically chargeable storage device 12 can be charged by an upper DC power output 14. The bottom electrically chargeable storage device 12 as described above with respect to the fourth embodiment, i.e. the bottom electrically chargeable storage device 12, can be charged with the two DC power outputs 14 in parallel or series for high power charging. If the charge protocols require different pre-charge stages 32, these circuits can be duplicated. Active switching elements S2, S3, S5 and S6 may be used isolate the not used outlets for safety.

As can be further seen in FIG. 5, the outlet chargers 30 comprise vertical isolation switches 40, which commonly enable a vertical isolation barrier 34. The vertical isolation barrier 34 is provided to vertically separate the electrically chargeable storage devices 12. The vertical isolation switching elements 42 are part of the switching assembly 18 in this embodiment.

According to an alternative embodiment, the pre-charge stage 32 of the non-used outlet 16 is used for ripple free transition from series to parallel on the high power outlet 16.

FIG. 6 shows a charging assembly 10 according to a sixth embodiment.

The charging assembly 10 of the sixth embodiment is based on the charging assembly 10 of the fifth embodiment. Hence, only differences between the two charging assemblies 10 will be discussed in detail as required. A repeated discussion of identical details is omitted. Hence, details of the charging assembly 10 of the sixth embodiment, which are not discussed in detail, are identical to those of the charging assembly 10 of the fifth embodiment.

Compared to the charging assembly 10 of the fifth embodiment, the charging assembly 10 according to the sixth embodiment comprises a modified switching assembly 18. Hence, the switching assembly 18 comprises an additional active switching element S11, which can be a semiconductor switching element. The operation of the charging assembly 10 of the sixth embodiment is as described above with respect to the charging assembly 10 of the fifth embodiment. Simultaneous charging of two electrically chargeable storage devices 12 is not supported, so that only one output can be used at one time. The bottom outlet 16, as shown in FIG. 6, can charge with the DC power outputs 14 in series or parallel, depending on the configuration of switching element S4. The upper outlet 16 can charge with both DC power outputs 14 in parallel depending on the configuration of switching element S11.

FIG. 7 shows a charging assembly 10 according to a seventh embodiment. The charging assembly 10 of the seventh embodiment is based on the charging assembly 10 of the sixth embodiment. Hence, only differences between the two charging assemblies 10 will be discussed in detail as required. A repeated discussion of identical details is omitted. Hence, details of the charging assembly 10 of the seventh embodiment, which are not discussed in detail, are identical to those of the charging assembly 10 of the sixth embodiment.

Compared to the charging assembly 10 of the sixth embodiment, the charging assembly 10 according to the seventh embodiment comprises a still further modified switching assembly 18. Hence, the switching assembly 18 comprises further switching elements S1, D2, S7, which can be semiconductor switching elements. The operation of the charging assembly 10 of the seventh embodiment is as described above with respect to the charging assembly 10 of the sixth embodiment. Simultaneous charging of two electrically chargeable storage devices 12 is not supported. Hence, both outlets 16 can charge with the DC power outputs 14 either in series or parallel, but only one outlet 16 can be used at a time. Both outlets 16 can connect to the DC power outputs 14 both in parallel and in series.

FIG. 8 shows a charging assembly 10 according to an eights embodiment. The charging assembly 10 of the eights embodiment is based on the charging assembly 10 of the seventh embodiment. Hence, only differences between the two charging assemblies 10 will be discussed in detail as required. A repeated discussion of identical details is omitted, Hence, details of the charging assembly 10 of the eights embodiment, which are not discussed in detail, are identical to those of the charging assembly 10 of the seventh embodiment.

Compared to the charging assembly 10 of the seventh embodiment, the charging assembly 10 according to the eights embodiment comprises a still further modified switching assembly 18. Hence, the switching assembly 18 comprises additional active switching elements S10, S11, which enable together with previous active switching elements S1, S4 full interconnection between the two DC power outputs 14 and the two outlets 16. Active switching elements S1, S10, S4, S11 are connected to share a single line 42 there between. Active switching elements S1, S10 form a half bridge with semiconductors, just like active switching elements S4, S11. The passive switching elements D2, D4 can be body diodes or actual diodes depending on requirements, e.g. losses, robustness, etc. Accordingly, each of the two outlets 16 is connectable via the switching assembly 16 to connect the two isolated DC power outputs 14 in series or in parallel independently. However, also according to the eighth embodiment, only one outlet 16 can be used at a time.

Figure 9:
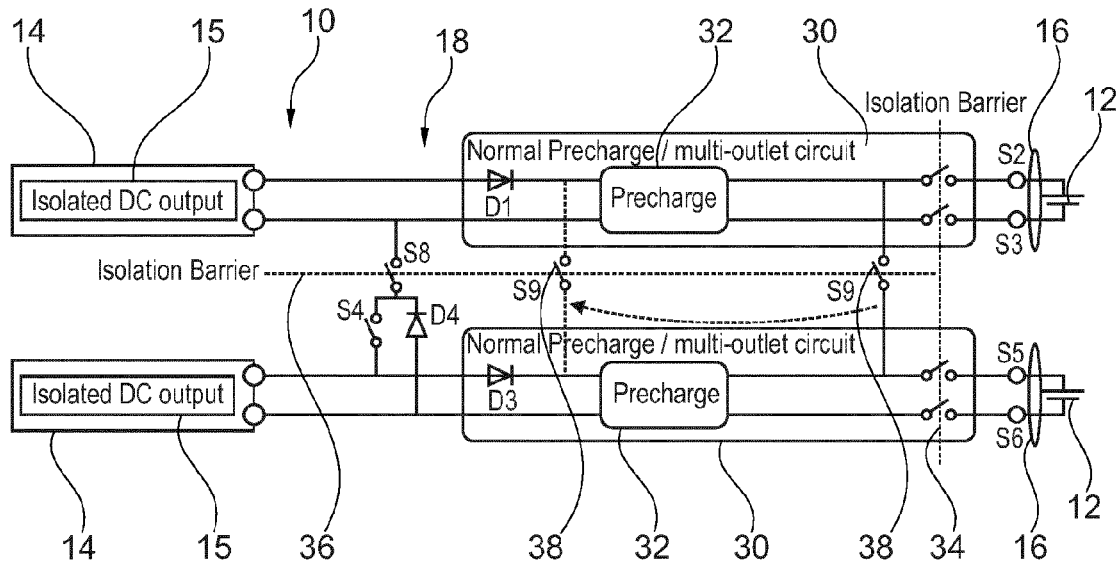
FIG. 9 shows a schematic view of a charging assembly according to a ninth embodiment comprising two isolated DC outputs and two outlet chargers and additional isolation between the two outlet chargers compared to the fifth embodiment.

FIG. 9 shows a charging assembly 10 according to a ninth embodiment. The charging assembly 10 of the ninths embodiment is based on the charging assembly 10 of the fifth embodiment. Hence, only differences between the two charging assemblies 10 will be discussed in detail as required. A repeated discussion of identical details is omitted. Hence, details of the charging assembly 10 of the ninth embodiment, which are not discussed again in detail, are identical to those of the charging assembly 10 of the fifth embodiment.

Compared to the charging assembly 10 of the fifth embodiment, the charging assembly 10 according to the ninth embodiment comprises a modified switching assembly 18. Hence, the switching assembly 18 comprises additional active switching elements S8 and S9. Furthermore, the charging assembly 10 comprises a horizontal isolation barrier 36, which is provided to horizontally separate the charging assembly 10 between individual isolated DC power outputs 14. The horizontal isolation barrier 38 enables a high degree of independency between the individual isolated DC power outputs 14. The horizontal isolation barrier 36 is realized with horizontal isolation switching elements 38. The horizontal isolation switching elements 38 are part of the switching assembly 18 in this embodiment.

With the charging assembly 10, according to a ninth embodiment, both electrically chargeable storage devices 12 can be charged simultaneously with normal voltage and normal current from each DC power output 14. Each outlet 16 can be used with its respective DC power output 14. The bottom outlet 16 can additionally be used for high power charging, with the two DC power outputs 14 connected either in series or in parallel to increase voltage and/or current. Hence, the outlets 16 can be used simultaneously with one DC power output 14. Alternatively, one outlet 16 can use the DC power outputs 14 either in series or in parallel.

Because the power levels can be different between the two DC power outputs 14, the harmonics are not automatically equivalent to a twelve-point rectifier 24. Hence, care has to be taken to harmonics.

Figure 10:
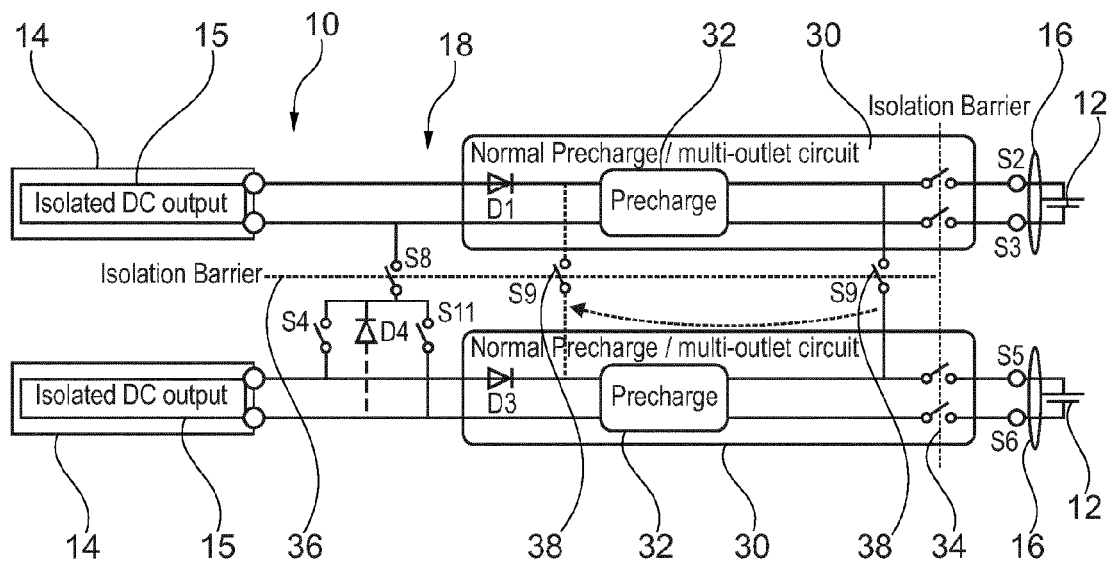
FIG. 10 shows a schematic view of a charging assembly according to a tenth embodiment comprising two isolated DC outputs and two outlet chargers for simultaneous charging and additional isolation between the two outlet chargers compared to the sixth embodiment.

FIG. 10 shows a charging assembly 10 according to a tenth embodiment. The charging assembly 10 of the tenth embodiment is based on the charging assembly 10 of the ninth embodiment. Hence, only differences between the two charging assemblies 10 will be discussed in detail as required. A repeated discussion of identical details is omitted. Hence, details of the charging assembly 10 of the tenth embodiment, which are not discussed again in detail, are identical to those of the charging assembly 10 of the ninth embodiment.

Compared to the charging assembly 10 of the ninth embodiment, the charging assembly 10 according to the tenth embodiment comprises a modified switching assembly 18. In detail, the switching assembly 18 of the tenth embodiment additionally comprises an active switching element S11. This enables to use a parallel configuration of both DC power outputs 14 for both outlets 16, i.e. one outlet 16 connected to one DC power output 14, but a series configuration of the two DC power outputs 14 on only one outlet 16. Active switching elements S8, S9 provide isolation between the two outlets 16 in case of simultaneous charging, i.e. with one outlet 16 connected to its respective DC power output 14. Hence, the outlets 16 can be used simultaneously with one DC power output 14. Alternatively, one outlet 16 can use the DC power outputs 14 either in series or in parallel, while the other can only put the DC power outputs 14 in parallel.

Figure 11:
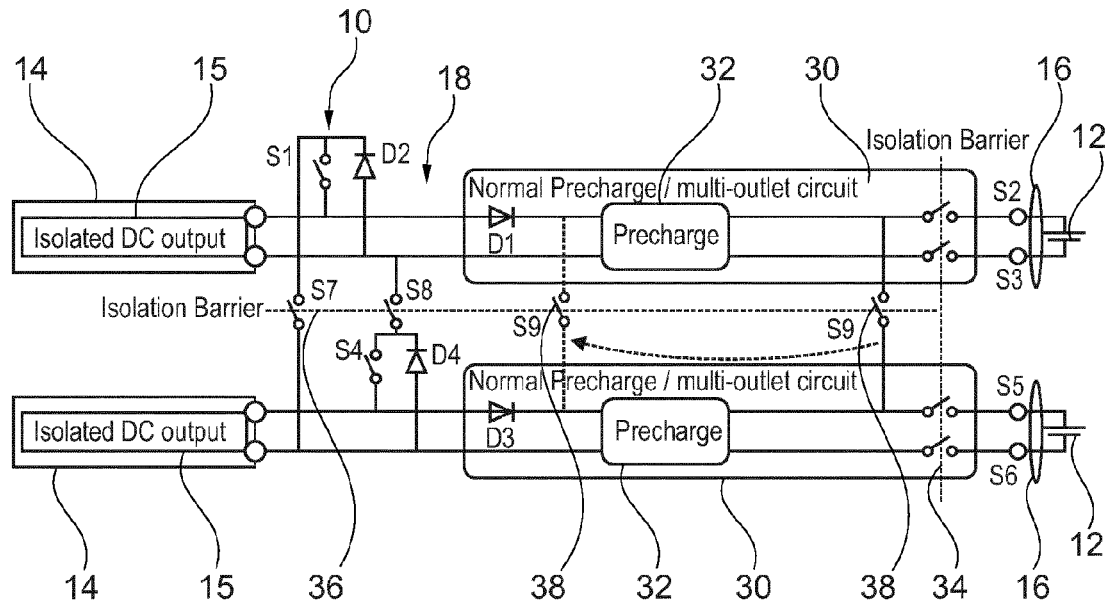
FIG. 11 shows a schematic view of a charging assembly according to an eleventh embodiment comprising two isolated DC outputs and two outlet chargers for simultaneous charging and a modified isolation between the two outlet chargers compared to the tenth embodiment.

FIG. 11 shows a charging assembly 10 according to an eleventh embodiment. The charging assembly 10 of the eleventh embodiment is based on the charging assembly 10 of the tenth embodiment. Hence, only differences between the two charging assemblies 10 will be discussed in detail as required. A repeated discussion of identical details is omitted. Hence, details of the charging assembly 10 of the eleventh embodiment, which are not discussed again in detail, are identical to those of the charging assembly 10 of the tenth embodiment.

Figure 12:
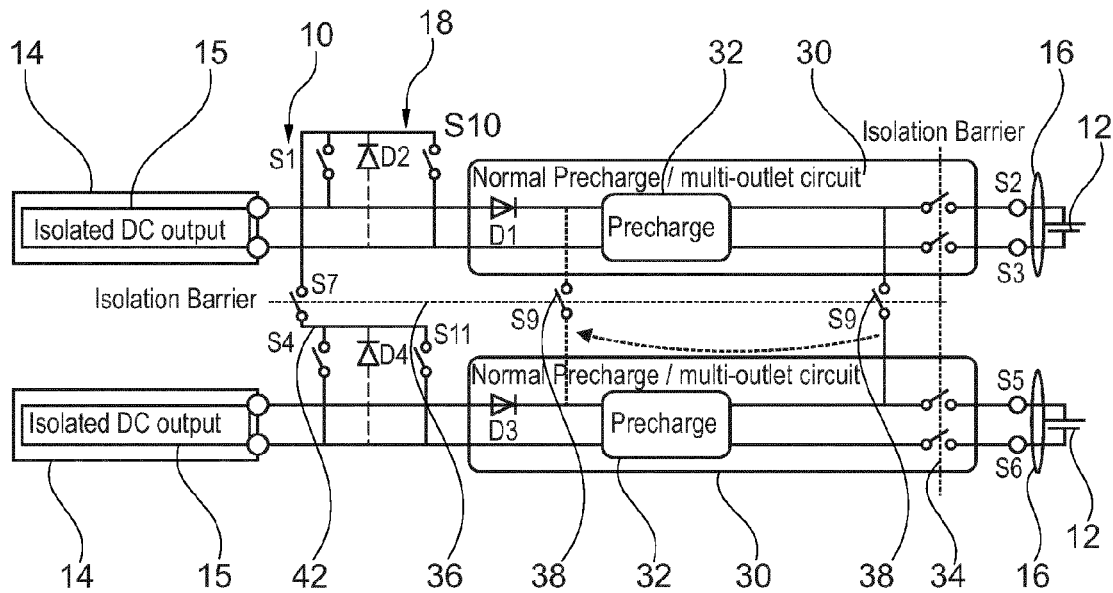
FIG. 12 shows a schematic view of a charging assembly according to a twelfth embodiment comprising two isolated DC outputs and two outlet chargers for simultaneous charging and additional isolation between the two outlet chargers compared to the seventh embodiment.

Compared to the charging assembly 10 of the tenth embodiment, the charging assembly 10 according to the eleventh embodiment comprises a modified switching assembly 18. Compared to the sixth embodiment, the charging assembly 10 according to the eleventh embodiment enables high power charging, with the two DC power outputs 14 connected either in series or in parallel. The outlets 16 can be used simultaneously with one DC power output 14. Alternatively, both outlets 16 can use the DC power outputs 14 either in series or in parallel, FIG. 12 shows a charging assembly 10 according to a twelfth embodiment. The charging assembly 10 of the twelfth embodiment is based on the charging assembly 10 of the eleventh embodiment. Hence, only differences between the two charging assemblies 10 will be discussed in detail as required. A repeated discussion of identical details is omitted. Hence, details of the charging assembly 10 of the twelfth embodiment, which are not discussed again in detail, are identical to those of the charging assembly 10 of the eleventh embodiment.

Figure 13:
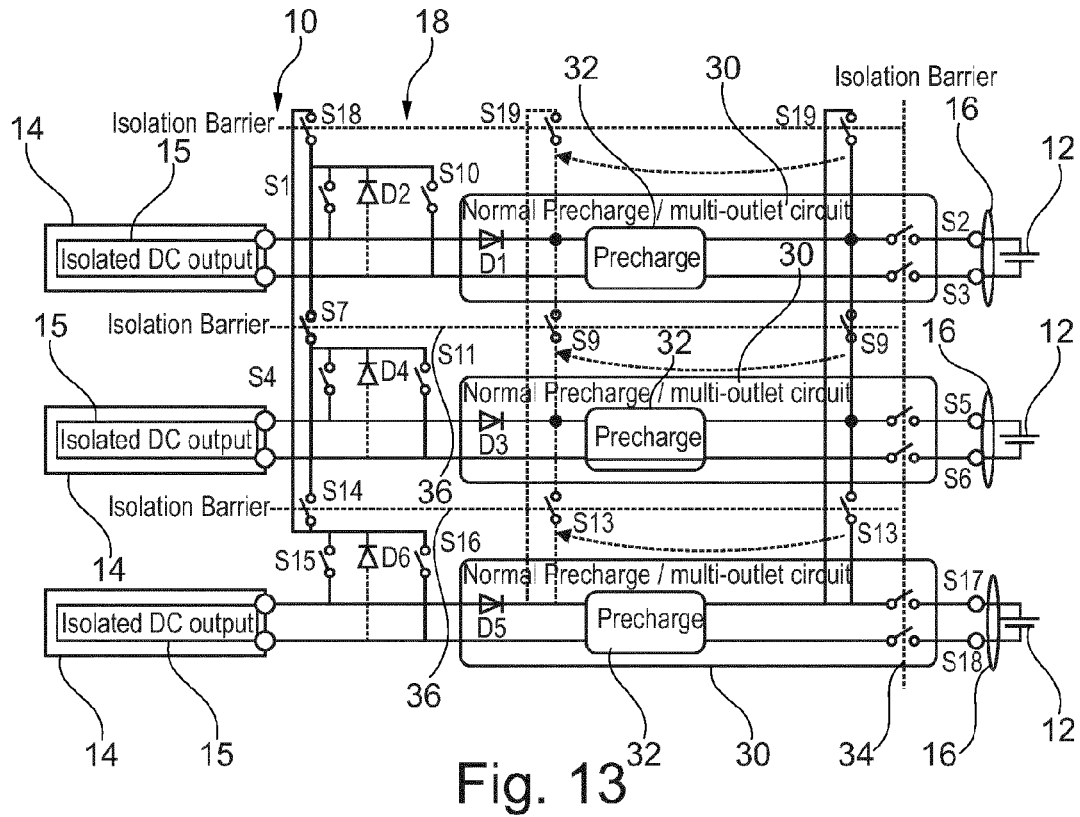
FIG. 13 shows a schematic view of a charging assembly according to a thirteenth embodiment comprising three isolated DC outputs and three outlet chargers for simultaneous charging and additional isolation between the three outlet chargers.

Compared to the charging assembly 10 of the eleventh embodiment, the charging assembly 10 according to the twelfth embodiment comprises a modified switching assembly 18. The charging assembly 10 according to the twelfth embodiment is similar to the charging assembly 10 according to the seventh embodiment, whereby simultaneous charging of the electrically chargeable storage devices 12 at each of the outlets 16 is enabled. Hence, the outlets 16 can be used simultaneously with one DC power output 14. Alternatively, both outlets 16 can use the DC power outputs 14 either in series or in parallel. The number of isolating switches can be reduced by one compared to the charging assembly 10 of the eleventh embodiment, FIG. 13 shows a charging assembly 10 according to a thirteenth embodiment. The charging assembly 10 of the thirteenth embodiment is based on the charging assembly 10 of the twelfth embodiment. Hence, only differences between the two charging assemblies 10 will be discussed in detail as required. A repeated discussion of identical details is omitted. Hence, details of the charging assembly 10 of the thirteenth embodiment, which are not discussed again in detail, are identical to those of the charging assembly 10 of the twelfth embodiment.

Compared to the charging assembly 10 of the twelfth embodiment, the charging assembly 10 according to the thirteenth embodiment comprises a further parallel DC power output 14 and an outlet 16, with an electrically chargeable storage device 12 connected thereto. The switching assembly 18 is modified to further connect the added DC power output 14 and outlet 16. With the charging assembly 10 according to the thirteenth embodiment, each outlet 16 can take the DC power output 14 of one or more of its neighboring outlets 16 and add the DC power outputs 14 in parallel or in series. This can be done for two or even three DC power outputs 14 simultaneously on one of the outlets 16. All three DC power outputs 14 can be connected in parallel, and up to two DC power outputs 14 can be connected in series, unless more switching devices/hardware is added. Hence, according to the thirteenth embodiment, the outlets 16 can be used simultaneously with one DC power output 14. Alternatively, one outlet 16 can use two DC power outputs 14 either in series or in parallel, while one of the DC power outputs 14 remains available for its respective outlet 16. Alternatively, one outlet 16 can be connected to all three DC power outputs 14 in parallel.

Figure 14:
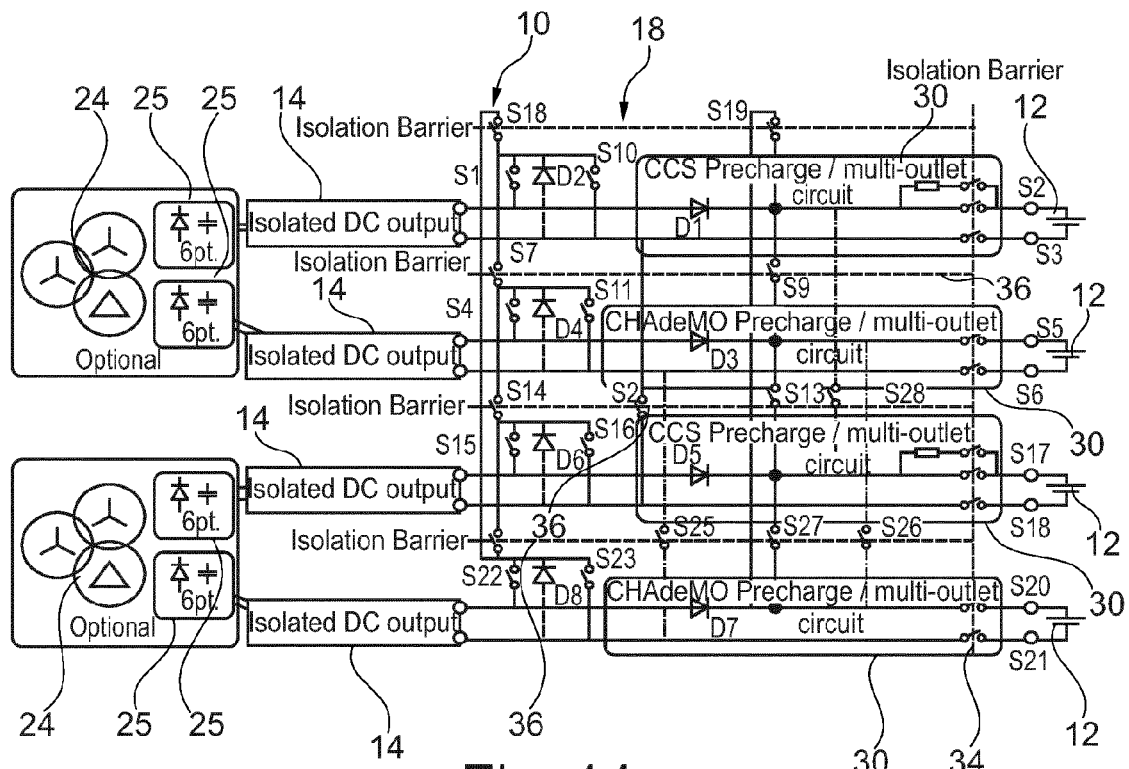
FIG. 14 shows a schematic view of a charging assembly according to a fourteenth embodiment comprising four isolated DC outputs and four outlet chargers for simultaneous charging and an additional isolation between the four outlet chargers.

FIG. 14 shows a charging assembly 10 according to a fourteenth embodiment. The charging assembly 10 of the fourteenth embodiment is based on the charging assembly 10 of the thirteens embodiment. Hence, only differences between the two charging assemblies 10 will be discussed in detail as required. A repeated discussion of identical details is omitted. Hence, details of the charging assembly 10 of the fourteenth embodiment, which are not discussed again in detail, are identical to those of the charging assembly 10 of the thirteenth embodiment.

Compared to the charging assembly 10 of the thirteenth embodiment, the charging assembly 10 according to the fourteenth embodiment comprises a total of four parallel DC power outputs 14 and four outlets 16, with an electrically chargeable storage device 12 connected to each of the outlets 16. Switching assembly 18 is modified to interconnect the DC power outputs 14 and outlets 16. With the charging assembly 10 according to the fourteens embodiment, each outlet 16 can take the DC power output 14 of one or more of its neighboring outlets 16 and add the DC power outputs 14 in parallel or in series. Hence, the charging assembly 18 enables charging the electrically chargeable storage device 12 with up to four times the power of one DC power output 14 connected in series or in parallel. Alternatively, two electrically chargeable storage devices 12 can be charged simultaneously with two times the power of a single DC power output 14 in series or parallel, or one to four times the power of one DC power output 14 in parallel on each outlet 16. Hence, the outlets 16 can be used simultaneously with one DC power output 14. Alternatively, two outlets 16 can use four DC power outputs 14 either in two times two in series or up to four in parallel. Not used DC power outputs 14 will remain available for its respective outlet 16. Alternatively the other two outlets 16 can use up to four DC power outputs 14 in parallel. In this case, not used DC power outputs 14 will remain available for the respective outlets 16.

In further detail, according to the fourteens embodiment, two outlets 16 are in-line with CHAdeMO specification, which enables up to 500V, and two outlets 16 are CCS which goes up to 1000V. Only switching element S24 is needed to allow the 2S2P configuration on both CCS outlets, but if we would need it on the CHAdeMO outlets, additional switching element S25 would be needed. In the four-outlet configuration not all combinations would be standard, but if we already have S24 and S25, the addition of S26 and S28 would make a complete matrix possible.

In a parallel configuration of the DC power outputs 14, voltage and current setpoints for all DC power outputs 14 can be the Ireq/4, or another current distribution can be chosen, e.g. depending on a current demand of the electrically chargeable storage devices 12. Details can be seen e.g. in FIG. 15. If e.g. during a given period of time, Ireq<3*Imodule, the number the number of parallel modules can be reduce and release an outlet 16 to be available for a next customer. If the current Ireq<2*Imodule we can release the outlets 16 to be available for series operation as well. This availability of voltage and current, or power can be indicated at the outlet 16.

If DC power outputs 14 are set in series, the voltage setpoint for the modules can be Vset/2 while the current set point can be distributed evenly or unevenly between DC power outputs 14.

By giving some DC power outputs 14 a different setpoint than others, they can be forced to perform voltage control or current control. It is advisable, in order to prevent oscillations, to make sure that this is well chosen. For instance, if two DC power outputs 14 are connected in series, the bottom one has a slightly higher current set point Iset1.1 and voltage setpoint Vset/2. Therefore, it will always be in voltage control, while the top DC power output 14 will determine the current regulation Iset, also with voltage setpoint V/2. In this way, the current regulation of both DC power outputs 14 will not interfere with each other. If there are two strings of DC power outputs 14 connected in parallel, the current should be nicely distributed between the bottom modules if they are both set to Iset*1.1/2 forcing them in voltage control, while the top DC power outputs 14 are set to Iset/2 to regulate the current.

For the transition from series to parallel, the current needs to be adjusted to the maximum current available in the whole string. Then, part of the configuration shuts down its charge current and output voltage is reduced to 0V. The switching assembly 18 configures (seamlessly) into a series configuration, the output diodes should take care of this. Then, the voltages can be equalized between the switching assemblies 18 without major dips/ripple in the output current.

According to a modified embodiment of the invention, the isolation converters 15 are commonly operated at a current set-point of multiples of a maximum current of each isolation converter (15). Different configurations are possible, which are only limited by the availability of the DC power outputs and overlapping demands of electrically chargeable storage devices connected thereto.

Figure 15:
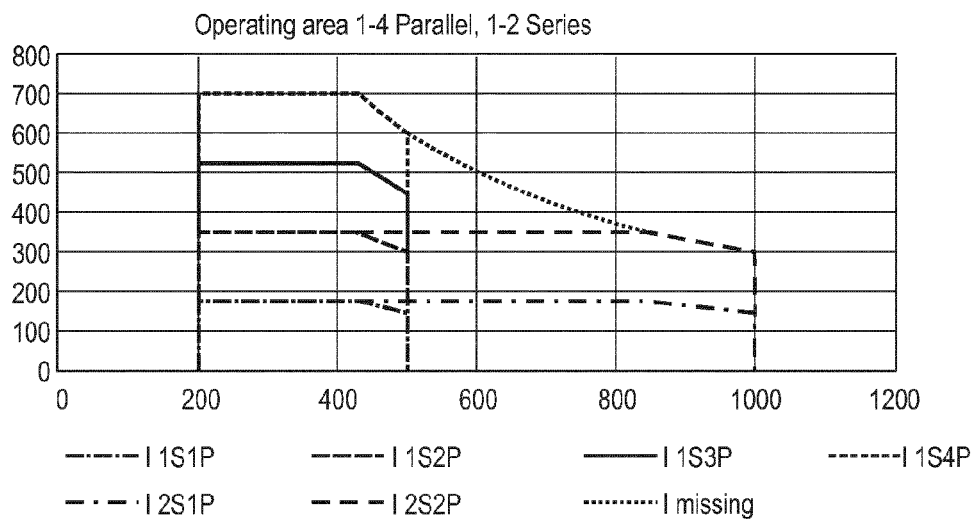
FIG. 15 shows a schematic diagram of an operating area of the charging assembly of the fourteenth embodiment with different charging configurations.

FIG. 15 shows a schematic diagram of an operating area of the charging assembly 10 of the fourteenth embodiment with different charging configurations. As can be seen, Different configurations are possible, which are only limited by the availability of the DC power outputs 14 and overlapping demands of electrically chargeable storage devices 12 connected thereto.

Figure 16:
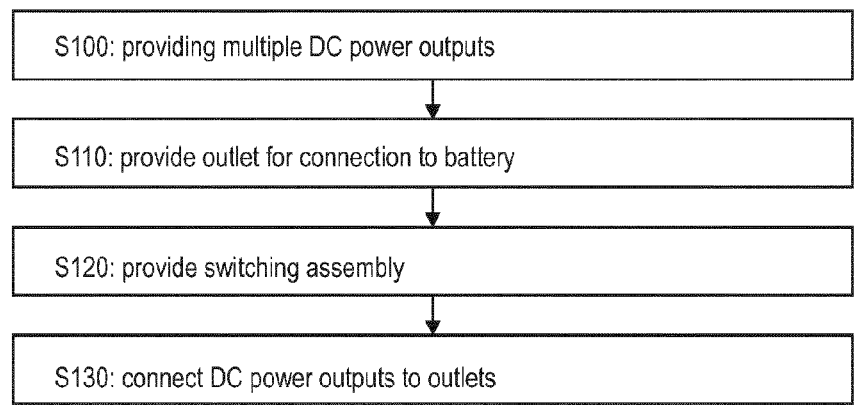
FIG. 16 shows a flow chart of a method for charging at least one electrically chargeable storage device in accordance with the present invention.

The present invention also provides a method for charging at least one electrically chargeable storage device 12, in particular an electrically chargeable storage device 12 for driving an electrical vehicle. The method is depicted in FIG. 16. The method starts with step S100 of providing multiple isolated DC power outputs 14.

In subsequent step S110, multiple outlets 16 for connection to the at least one electrically chargeable storage device 12 is provided.

According to step S120, at least one switching assembly 18 is provided for connecting the multiple isolated DC power outputs 14 to the at least one outlet 16 for connection to the at least one electrically chargeable storage device 12.

In subsequent step S130, at least two of the multiple isolated DC power outputs 14 are connected in series and/or in parallel to one outlet 16. Furthermore, at least two of the multiple isolated DC power outputs 14 are connected in series and/or in parallel independently to multiple outlets 16.

Furthermore, according to step S130, the isolated DC power outputs 14 are operated at different current set-points, whereby a current set-point of one DC power output 14 is slightly higher than a current set-point of another DC power output 14. The current set-point of the one DC power output 14 is preferably between a 1% and a 40% higher, further preferred between a 3% and a 30% higher, still further preferred between a 5% and a 20% higher. In parallel configuration, the voltage and current setpoints for all DC power outputs 14 are set to be the Ireq/4 or another distribution, depending on a current demand. If for a given period of time, Ireq<3*Imodule, the number of parallel DC power outputs 14 is reduced and an outlet 16 is released to be available for another customer. If for a given period of time, the current Ireq<2*Imodule, two outlets 16 are released, which are then available for series operation as well. In particular, if the DC power outputs 14 are connected in series, a voltage setpoint for the DC power outputs 14 can be Vset/2. A current set point can be distributed evenly or unevenly between the DC power outputs 14. By giving some DC power outputs 14 a different setpoint than others, they can be forced into voltage control or current control. Typically, if two DC power outputs are connected in series, one has a slightly higher current set point Iset*1.1 and voltage setpoint Vset/2. Therefore, the respective DC power output 14 will always be in voltage control, while the other DC power output 14 will determine a current regulation Iset, also with voltage setpoint V/2. If there are two strings of DC power outputs 14 provided in parallel, a current is nicely distributed between e.g. the bottom DC power outputs 14, e.g. if they are both set to Iset*1.1/2 forcing them in voltage control, while the top DC power outputs 14 are set to Iset/2 to regulate the current.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 10 charging assembly
12 electrically chargeable storage device
14 DC power output
15 isolation converter
16 outlet
18 switching assembly
20 isolation power supply
22 AC power source
24 twelve-point rectifier
25 six-point supply
26 Vienna rectifier
27 DC link
28 supply output
30 outlet charger
32 pre-charge stage
34 vertical isolation barrier
36 horizontal isolation barrier
38 horizontal isolation switch
40 vertical isolation switch
42 single line

The invention claimed is:

1. A charging assembly for charging at least one electrically chargeable storage device, in particular an electrically chargeable storage device for driving an electrical vehicle, comprising:
multiple isolated DC power outputs,
at least one outlet for connection to the at least one electrically chargeable storage device, and
at least one switching assembly for connecting the multiple isolated DC power outputs to the at least one outlet for connection to the at least one electrically chargeable storage device,
wherein the switching assembly is adapted to connect at least two of the multiple isolated DC power outputs in series and/or in parallel to the at least one outlet, and
wherein the charging assembly controls the switching assembly to dynamically configure a maximum charging voltage.

2. The charging assembly according to claim 1,
wherein the charging assembly comprises communication means for connecting to corresponding communication means of the storage device and for receiving a maximum charging voltage from the storage device, and
wherein the charging assembly controls the switching assembly to connect at least two of the multiple isolated DC power outputs in series and/or in parallel to the at least one outlet depending on the maximum charging voltage.

3. The charging assembly according to claim 1, wherein the charging assembly comprises multiple outlets for connection to multiple electrically chargeable storage devices,
wherein each outlet is connectable to one electrically chargeable storage device, and
wherein the switching assembly is adapted to connect at least two of the multiple isolated DC power outputs in series and/or in parallel independently to multiple outlets.

4. The charging assembly according to claim 1, wherein the charging assembly comprises at least one isolation power supply, each of which provides at least two supply outputs connected to one isolated DC power output each.

5. The charging assembly according to claim 4, wherein an isolation power supply comprises an AC power source and at least one out of a twelve-point rectifier or a Vienna rectifier, and
wherein the twelve-point rectifier or the Vienna rectifier have two supply outputs connected to one isolated DC power output each.

6. The charging assembly according to claim 5, wherein the isolation power supply is configured to operate both supply outputs with an essentially equal load.

7. The charging assembly according to claim 1, wherein each isolated DC power output comprises an isolation converter.

8. The charging assembly according to claim 7, wherein the isolation converters are commonly operated at a current set-point of multiple of a maximum current of each isolation converter.

9. The charging assembly according to claim 1, wherein the charging assembly comprises at least one outlet charger, each of which is connected to one outlet.

10. The charging assembly according to claim 1, wherein the charging assembly comprises at least one pre-charge stage, each of which is connected to one outlet.

11. The charging assembly according to claim 1, wherein the switching assembly comprises a combination of active and passive switching elements.

12. The charging assembly according to claim 1, wherein the charging assembly comprises a vertical isolation barrier, which is provided to vertically separate the electrically chargeable storage devices.

13. The charging assembly according to claim 1, wherein the charging assembly comprises at least one horizontal isolation barrier, which is provided to horizontally separate the charging assembly between individual isolated DC power outputs.

14. A method for charging at least one electrically chargeable storage device, comprising the steps of
providing multiple isolated DC power outputs,
providing at least one outlet for connection to the at least one electrically chargeable storage device,
providing at least one switching assembly for connecting the multiple isolated DC power outputs to the at least one outlet for connection to the at least one electrically chargeable storage device,
connecting at least two of the multiple isolated DC power outputs in series and/or in parallel to the at least one outlet, and
controlling the switching assembly, via the charging assembly, to dynamically configure a maximum charging voltage.

15. The method according to claim 14, wherein the step of providing at least one outlet for connection to the at least one electrically chargeable storage device comprises providing multiple outlets, and
wherein the step of connecting at least two of the multiple isolated DC power outputs in series and/or in parallel to the at least one outlet comprises connecting at least two of the multiple isolated DC power outputs in series and/or in parallel independently to the multiple outlets.

16. The method according to claim 15, wherein the step of connecting at least two of the multiple isolated DC power outputs in series to the at least one outlet comprises operating at least one of the at least two of the multiple isolated DC power outputs at a current set-point slightly higher than at least one of the at least two of the multiple isolated DC power outputs.

17. The method according to claim 14, wherein the step of connecting at least two of the multiple isolated DC power outputs in series to the at least one outlet comprises operating at least one of the at least two of the multiple isolated DC power outputs at a current set-point slightly higher than at least one of the at least two of the multiple isolated DC power outputs.

18. The method according to claim 17, wherein the at a current set-point slightly higher than at least one of the at least two of the multiple isolated DC power outputs is between 1% and a 40% higher.

19. The method according to claim 17, wherein the at a current set-point slightly higher than at least one of the at least two of the multiple isolated DC power outputs is between 3% and a 30% higher.

* * * * *